UNITED STATES PATENT OFFICE 2,486,249

ACYLAMINO-N-SUBSTITUTED AMIDES

Paul G. Bird, Western Springs, Ill., assignor to National Aluminate Corporation, Chicago, Ill., a corporation of Delaware No Drawing. Application July 19, 1947, Serial No. 762,197

5 Claims. (Cl. 260—404.5)

This invention relates to high molecular weight acylamino-N-alkylated amides, and more specifically to new chemical compounds of that character having the general formula:

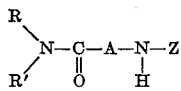

where R and R' are alkyl groups, and either R or R', but not both may be hydrogen; Z is the acyl radical of an organic monobasic acid; and A is alkylene, arylene, or aralkylene.

The present application is a continuation-in-part of my copending application, Serial No. 436,488, filed March 27, 1942, Patent No. 2,428,775, issued October 14, 1947.

These compounds may be considered as derivatives or reaction products of an amino acid which has been reacted with an organic monobasic acid or derivative thereof and an aliphatic primary or secondary amine which has been acylated by the amino acid. Thus, the resulting compound will be seen to contain two amide groups.

The amino acid referred to above may be aliphatic, aromatic, or aliphatic-aromatic. The organic acid employed to acylate the amino group of the said amino acid should preferably be long-chain aliphatic, containing at least 12 carbon atoms, and may contain one or more double bonds and may contain substituent groups, e. g., hydroxyl. Examples of suitable acids include lauric, stearic, oleic, ricinoleic, linoleic, and higher homologs. The aliphatic primary or secondary amine should contain one or two carbon chains of at least 12 carbon atoms. Examples of suitable aliphatic amines include di-dodecylamine, dodecylamine, hexadecylamine, octadecylamine, and octadecenylamine.

While I have, for convenience, referred to these compounds as resulting from the reaction of substantially equal molecular portions of an amino acid, an organic monobasic acid, and an aliphatic primary or secondary amine, it will be understood by anyone skilled in the art that they may be prepared in numerous ways, and under a variety of conditions. Thus, the amino acid may be acylated not only by an organic monobasic acid, but also by certain derivatives thereof such as the halide, ester, and amide. Likewise, the amino acid ester may be acylated instead of the free acid.

A preferred method of preparing the compounds of this invention consists in first reacting equimolecular amounts of a high molecular weight fatty acid halide, e. g., the chloride, with an amino acid in which the amino group may be on any alkyl carbon, amino aromatic carboxylic acids, and amino aralkyl acids. Such reaction may be carried out with or without solvent or additional reaction medium and under a wide variety of temperature conditions, preferably at such temperature that the reaction mixture is a single phase. Alkaline reagents may be used to absorb the hydrogen halide produced or sufficiently high temperatures may be employed so that the hydrogen halide is evolved as a gas.

When this first reaction has reached substantial completion, the so-obtained acylamino acids are further reacted with a primary or secondary amine which results in the conversion of the carboxyl group to an N-alkylated amide group. This second reaction in the preparation is carried out under conditions favoring the elimination of water, which conditions may include use of reduced pressures, elevated temperatures, and distillation with a solvent capable of forming an azeotropic mixture.

It is not intended that the invention be limited in scope to acylamino-N-alkylated amides prepared by any particular route, or in any particular manner, and the following examples are given merely by way of illustration.

Example I

The ethyl ester of glycine (alpha-aminoacetic acid) was prepared by suspending 10 grams of glycine in 50 ml. of absolute ethanol and passing dry hydrogen chloride into the warmed suspension until the glycine dissolved. Upon cooling, the ester hydrochloride separated and was recovered by filtration. Five grams of the ester hydrochloride was dissolved in 10 ml. of pyridine at 110° C. and 9 ml. of palmityl chloride was added to the stirred solution dropwise. The mixture was stirred for 2 hours at 115–120° C. and then poured into water. The product was washed twice in boiling water and recrystallized from ethanol to give a material melting at 73–74° C. This was identified by analysis as N-palmityl glycine ethyl ester. Calculated for $C_{20}H_{39}O_3N$: N=4.10%; found N=3.90 and 4.13%.

A mixture of 4.8 grams of the N-palmityl glycine ethyl ester was mixed with 3.4 grams of hexadecylamine and heated to 145° C. The mixture was stirred 4 hours at 145–150° C. After cooling, the wax-like product was recrystallized from ethanol to give a material melting at 132–133° C. which was identified by analysis as alpha - palmitylamino - N - hexadecylacetamide.

Calculated for $C_{34}H_{68}O_2N_2$: N=5.25%; found N=5.24 and 5.18%.

*Example II*

The ethyl ester of epsilon-aminocaproic acid was prepared by suspending 10 grams of the amino acid in 50 ml. of absolute ethanol and passing dry hydrogen chloride into the warmed mixture until solution was complete. The excess ethanol was removed by evaporation under reduced pressure, leaving the waxy ester hydrochloride. Seven grams of the ester hydrochloride was mixed with 8 ml. of pyridine and heated to 90° C. after which 9 ml. of palmityl chloride was added dropwise with stirring and the mixture then stirred 4 hours at 105–110° C. The ethyl epsilon-palmitylaminocaproate was recovered by pouring the reaction mixture into water and washing the precipitate twice with boiling water. After recrystallization it melted at 87–88° C.

A mixture of 5.3 grams of the ethyl epsilon-palmitylaminocaproate and 3.58 grams of octadecylamine was heated to 140° C. and stirred 4 hours at 140–145° C. The product, when cool, was a light tan wax which was purified by recrystallization from ethanol to yield a material melting at 120–121° C. and which was identified by analysis as epsilon-palmitylamino-N-octadecylcaproamide. Calculated for $C_{40}H_{80}O_2N_2$: N=4.51%; found N=4.32 and 4.28%.

The same material was also prepared in the following way: To 10.5 grams of palmityl chloride at 130° C., 5 grams of epsilon-aminocaproic acid was added with stirring. The mixture was stirred at 150–160° C. for an hour after which 10.2 grams of n-octadecylamine was added and stirring and heating continued 2 hours longer. When cool, the crude palmitylamino-N-octadecylcaproamide was a brown wax.

*Example III*

To a melt of 1.8 grams of ethyl p-aminobenzoate at 110° C. was added 3 ml. of palmityl chloride dropwise with stirring. The mixture was stirred one hour at 140° C. and then recrystallized from ethanol to give a material melting at 96–97° C. which was identified as ethyl p-palmitylaminobenzoate by analysis. Calculated for $C_{25}H_{40}O_3N$: N=3.47%; found N=3.52 and 3.40%.

A mixture of 2.5 grams of the ethyl palmitylaminobenzoate and 1.7 grams of octadecylamine was stirred 4 hours at 140–150° C. The resulting p-palmitylamino-N-octadecylbenzamide was recrystallized from methanol to give a material melting at 89–90° C.

*Example IV*

One gram of delta-aminovaleric acid was dissolved in 25 ml. of 10% aqueous NaOH and 0.9 gram of palmityl chloride was added with shaking. The solid which formed was filtered off, dried, stirred into 25 ml. of water, neutralized with HCl, filtered again, and the product dried and recrystallized from dioxane to a constant melting point of 119–119.5° C. It was identified as delta-palmitylaminovaleric acid by analysis. Calculated for $C_{21}H_{41}O_3N$: N=3.94%; found N=3.70%.

A mixture of 0.2 gram of the delta-palmitylaminovaleric acid and 0.15 gram of hexadecylamine was stirred for 6 hours at 135° C. After cooling, the product was extracted with acetone, and the residue recrystallized from methanol to give a product melting at 137–137.5° C. which was identified as delta-palmitylamino-N-hexadecylvaleramide. Calculated for $C_{37}H_{74}O_2N_2$: N=4.84%; found N=4.71 and 4.67%.

*Example V*

A mixture of 3 grams of p-aminophenylacetic acid and 5.4 grams of palmityl chloride in 25 cc. dry pyridine was refluxed for 6 hours. The mixture was then poured into water, boiled, and the product recovered by filtration and recrystallized from acetone to a melting point of 153.5–154.5° C. The material was identified as p-palmitylaminophenylacetic acid by analysis. Calculated for $C_{24}H_{39}O_3N$: N=3.60%; found N=3.55 and 3.62%.

A mixture of 2.1 grams of the above intermediate and 1.3 grams of hexadecylamine was heated 4 hours with stirring at 130° C. The resulting p-palmitylamino-N-hexadecylphenylacetamide was a brown wax. It was also prepared without the use of pyridine by stirring at 250° C. for 30 minutes a mixture of 11 grams of palmityl chloride and 6.1 grams of p-aminophenylacetic acid and then adding 9.6 grams of n-hexadecylamine and stirring another hour at the same temperature. The product, when cool, was a hard, brown wax, slightly soluble in ethanol, benzene, or carbon tetrachloride.

*Example VI*

To 11 grams of palmityl chloride at 150° C. was added, portion-wise with stirring, 4.7 grams of alpha-amino-n-valeric acid. The addition required about 30 minutes in order to prevent too rapid a reaction. Then 9.6 grams of n-hexadecylamine was added and the mixture stirred at 150–160° C. for 2.5 hours. When cool, the resulting alpha-palmitylamino-N-hexadecylvaleramide was a hard, tan wax. It was soluble in ethanol, benzene, or carbon tetrachloride but much less so in petroleum ether. Recrystallization from either ethanol or petroleum ether gave a product melting at 89–90° C.

*Example VII*

11 grams of palmityl chloride, 4.1 grams of alpha-amino-n-butyric acid, and 9.6 grams of n-hexadecylamine were caused to react in a manner similar to the procedure of Example VI. When cool, the resulting alpha-palmitylamino-N-hexadecylbutyramide was a brown wax which exhibited about the same solubility characteristics as the product of Example VI.

The compounds of this invention are greases or waxes of varying degrees of hardness and are valuable as substitutes for natural waxes, as constituents of coating compositions, as corrosion inhibitors, as defoamers, and as intermediates for the preparation of other valuable compounds.

Having thus described my invention, what I claim as new and desire to secure by Letters Patent of the United States is:

1. An acylamino-N-alkylated amide having the formula:

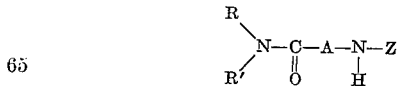

wherein R is alkyl, R' is selected from the group consisting of hydrogen and alkyl, Z is the acyl radical of an organic monobasic acid linked to the nitrogen atom to form an amide, and A is selected from the group consisting of alkylene, arylene, and aralkylene.

2. Palmitylamino-N-octadecylcaproamide
3. Palmitylamino-N-hexadecylvaleramide
4. Palmitylamino-N-hexadecylbutyramide 5. An acylamino-N-alkylated amide having the formula:

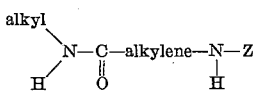

wherein Z is a carboxylic acyl radical of a monobasic aliphatic carboxylic acid containing at least 12 carbon atoms linked to the nitrogen atom to form an amide.

PAUL G. BIRD.

REFERENCES CITED

The following references are of record in the file of this patent:

UNITED STATES PATENTS

| Number | Name | Date |
|---|---|---|
| 2,278,417 | Baldwin et al. | Apr. 7, 1942 |
| 2,328,551 | Gunderson | Sept. 7, 1943 |
| 2,384,081 | DeGroote et al. | Sept. 4, 1945 |